United States Patent
Hokai et al.

(10) Patent No.: US 12,366,662 B2
(45) Date of Patent: Jul. 22, 2025

(54) VEHICLE SENSOR ATTACHING STRUCTURE AND SENSOR CONTROL DEVICE

(71) Applicant: TOYOTA JIDOSHA KABUSHIKI KAISHA, Toyota (JP)

(72) Inventors: Keisuke Hokai, Gotemba (JP); Shoichi Hayasaka, Atsugi (JP); Hiromitsu Urano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 948 days.

(21) Appl. No.: 17/493,196

(22) Filed: Oct. 4, 2021

(65) Prior Publication Data

US 2022/0196842 A1    Jun. 23, 2022

(30) Foreign Application Priority Data

Dec. 23, 2020   (JP) .................. 2020-214094

(51) Int. Cl.

| | | |
|---|---|---|
| *G01S 17/931* | (2020.01) | |
| *G01S 7/497* | (2006.01) | |
| *G01S 17/08* | (2006.01) | |
| *G01S 17/86* | (2020.01) | |
| *B60S 1/04* | (2006.01) | |
| *B60S 1/46* | (2006.01) | |
| *B60S 1/54* | (2006.01) | |

(52) U.S. Cl.
CPC .......... *G01S 17/931* (2020.01); *G01S 7/497* (2013.01); *G01S 17/08* (2013.01); *G01S 17/86* (2020.01); *B60S 1/04* (2013.01); *B60S 1/46* (2013.01); *B60S 1/54* (2013.01); *G01S 2007/4977* (2013.01)

(58) Field of Classification Search
None
See application file for complete search history.

(56) References Cited

U.S. PATENT DOCUMENTS

| | | | |
|---|---|---|---|
| 2006/0250297 A1* | 11/2006 | Prakah-Asante | G01S 13/862 367/87 |
| 2012/0242972 A1* | 9/2012 | Wee | G01S 17/931 356/4.01 |
| 2012/0327239 A1 | 12/2012 | Inoue et al. | |
| 2014/0330479 A1 | 11/2014 | Dolgov et al. | |
| 2018/0099661 A1* | 4/2018 | Bae | B60W 30/06 |

(Continued)

FOREIGN PATENT DOCUMENTS

| | | |
|---|---|---|
| DE | 102010002835 A1 | 9/2011 |
| JP | 2007140852 A * | 6/2007 |

(Continued)

OTHER PUBLICATIONS

Machine translation of JP-2007140852-A (Year: 2025).*

*Primary Examiner* — Aniss Chad
*Assistant Examiner* — Jennifer M Anda
(74) *Attorney, Agent, or Firm* — Dinsmore & Shohl LLP

(57) ABSTRACT

In a vehicle sensor attaching structure in which a first sensor and second sensors for detecting an object outside a vehicle by sensor fusion are attached to the vehicle, the first sensor and the second sensors are disposed side by side in a uniaxial direction along a surface of the vehicle, and the one first sensor is disposed to be sandwiched between the two second sensors at equal intervals.

2 Claims, 12 Drawing Sheets

(56) References Cited

U.S. PATENT DOCUMENTS

2019/0361100 A1* 11/2019 Abari .................. G01S 17/42
2020/0207312 A1* 7/2020 Kamiya ................ B60S 1/52
2020/0333439 A1* 10/2020 Mahajan .............. G01S 7/4802

FOREIGN PATENT DOCUMENTS

| JP | 2017-214065 A | 12/2017 |
| JP | 2019-175048 A | 10/2019 |
| WO | 2011/145141 A1 | 11/2011 |

\* cited by examiner

VEHICLE SENSOR ATTACHING STRUCTURE AND SENSOR CONTROL DEVICE

CROSS-REFERENCE TO RELATED APPLICATION

This application claims priority to Japanese Patent Application No. 2020-214094 filed on Dec. 23, 2020, incorporated herein by reference in its entirety.

BACKGROUND

1. Technical Field

The disclosure relates to a vehicle sensor attaching structure and a sensor control device.

2. Description of Related Art

Japanese Unexamined Patent Application Publication No. 2017-214065 (JP 2017-214065 A) is known as a technical document relating to a vehicle sensor attaching structure. JP 2017-214065 A describes a vehicle in which Light Detection and Ranging (LiDAR) is provided on a roof and a front camera is attached to an inner side of a windshield.

SUMMARY

A technique of sensor fusion has been known in which an object outside a vehicle is recognized by integratedly using detection results from a plurality of sensors mounted on the vehicle, for example. When such sensor fusion is performed, it is desirable to determine a positional relationship of each sensor in consideration of characteristics of the sensor fusion.

One aspect of the disclosure relates to a vehicle sensor attaching structure in which a first sensor and second sensors for detecting an object outside a vehicle by sensor fusion are attached to the vehicle. The first sensor and the second sensors are disposed side by side in a uniaxial direction along a surface of the vehicle, and the one first sensor is disposed to be sandwiched between the two second sensors at equal intervals.

With the vehicle sensor attaching structure according to one aspect of the disclosure, since the first sensor and the second sensors that perform sensor fusion are disposed side by side in the uniaxial direction along the surface of the vehicle, arithmetic processing for the sensor fusion can be facilitated just by reflecting a difference in a position of each sensor in the uniaxial direction as compared with a case where the first sensor and the second sensors are randomly disposed in the up-down, right-left, and the front-rear directions. With the vehicle sensor attaching structure, since the one first sensor is disposed to be sandwiched between the two second sensors at equal intervals, arithmetic processing for the sensor fusion can be facilitated as compared with a case where a distance from the one first sensor and the one second sensor and a distance from the one first sensor and the other second sensor are different, so that accuracy of object recognition and the like can be improved.

In the vehicle sensor attaching structure described above, the first sensor may be a camera and the second sensors may be LiDAR. With the vehicle sensor attaching structure, a camera with a wide detection angle is disposed to be sandwiched between two LiDARs that have long detection distances at equal intervals, which is advantageous for object recognition by the sensor fusion.

In the vehicle sensor attaching structure described above, detection ranges of the two second sensors may have an overlap detection range that overlaps in front of the first sensor. With the vehicle sensor attaching structure, the detection ranges of the two second sensors have an overlap detection range that overlaps in front of the first sensor, so that object recognition can be effectively performed by the sensor fusion.

Another aspect of the disclosure relates to a sensor control device that controls the first sensor and the second sensors in the vehicle sensor attaching structure described above. The sensor control device includes a sensor control unit that controls the first sensor and the second sensors. The first sensor is a camera, the two second sensors are LiDAR, and the sensor control unit is able to switch control modes of the second sensors between a high cycle detection mode in which the two second sensors alternately scan the overlap detection range and a high density detection mode in which the two second sensors simultaneously scan the overlap detection range.

With the sensor control device according to another aspect of the disclosure, since the control modes of the second sensors can be switched between the high cycle detection mode in which the two second sensors alternately scan the overlap detection range and the high density detection mode in which the two second sensors simultaneously scan the overlap detection range, it is possible to appropriately recognize an object by the sensor fusion by switching the control modes according to a state of the vehicle or the like.

In the sensor control device described above, the sensor control unit may switch the control modes of the second sensors to the high cycle detection mode when a vehicle speed of the vehicle is equal to or higher than a first threshold value, and switch the control modes of the second sensors to the high density detection mode when the vehicle speed of the vehicle is less than a second threshold value, and the second threshold value may be a threshold value having the same value as the first threshold value or a value smaller than the first threshold value. With the sensor control device, by switching the control modes of the second sensors to the high cycle detection mode when the vehicle speed of the vehicle is equal to or higher than the first threshold value, the object can be recognized in a short period of time when the vehicle speed is high and an external condition of the vehicle changes at a high speed. Further, by switching the control modes of the second sensors to the high density detection mode when the vehicle speed of the vehicle is less than the second threshold value, the object can be accurately recognized in a situation in which the vehicle speed is low and an external condition of the vehicle changes at a low speed.

Still another aspect of the disclosure relates to the sensor control device that controls the first sensor and the second sensors in the vehicle sensor attaching structure described above. The sensor control device includes a first cleaning device attached to the one first sensor, a second cleaning device attached to one of the two second sensors, a third cleaning device attached to another of the two second sensors, and a cleaning device control unit that controls a cleaning timing of each of the first cleaning device, the second cleaning device, and the third cleaning device. The cleaning device control unit controls the cleaning timing such that a cleaning time of the first cleaning device does not overlap a cleaning time of the second cleaning device and a cleaning time of the third cleaning device.

With the sensor control device according to still another aspect of the disclosure, the cleaning timing is controlled such that the cleaning time of the first cleaning device does not overlap the cleaning times of the second cleaning device and the third cleaning device, so that it is possible to suppress the occurrence of a situation in which the cleaning times overlap and object recognition by the sensor fusion is hindered.

According to each aspect of the disclosure, arithmetic processing for the sensor fusion can be facilitated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described with reference to the drawings. In each figure, a rectangular coordinate system is shown in which a vehicle front-rear direction is an X-axis, a vehicle width direction is a Y-axis, and a vehicle height direction is a Z-axis.

Vehicle Sensor Attaching Structure

Figure 1:
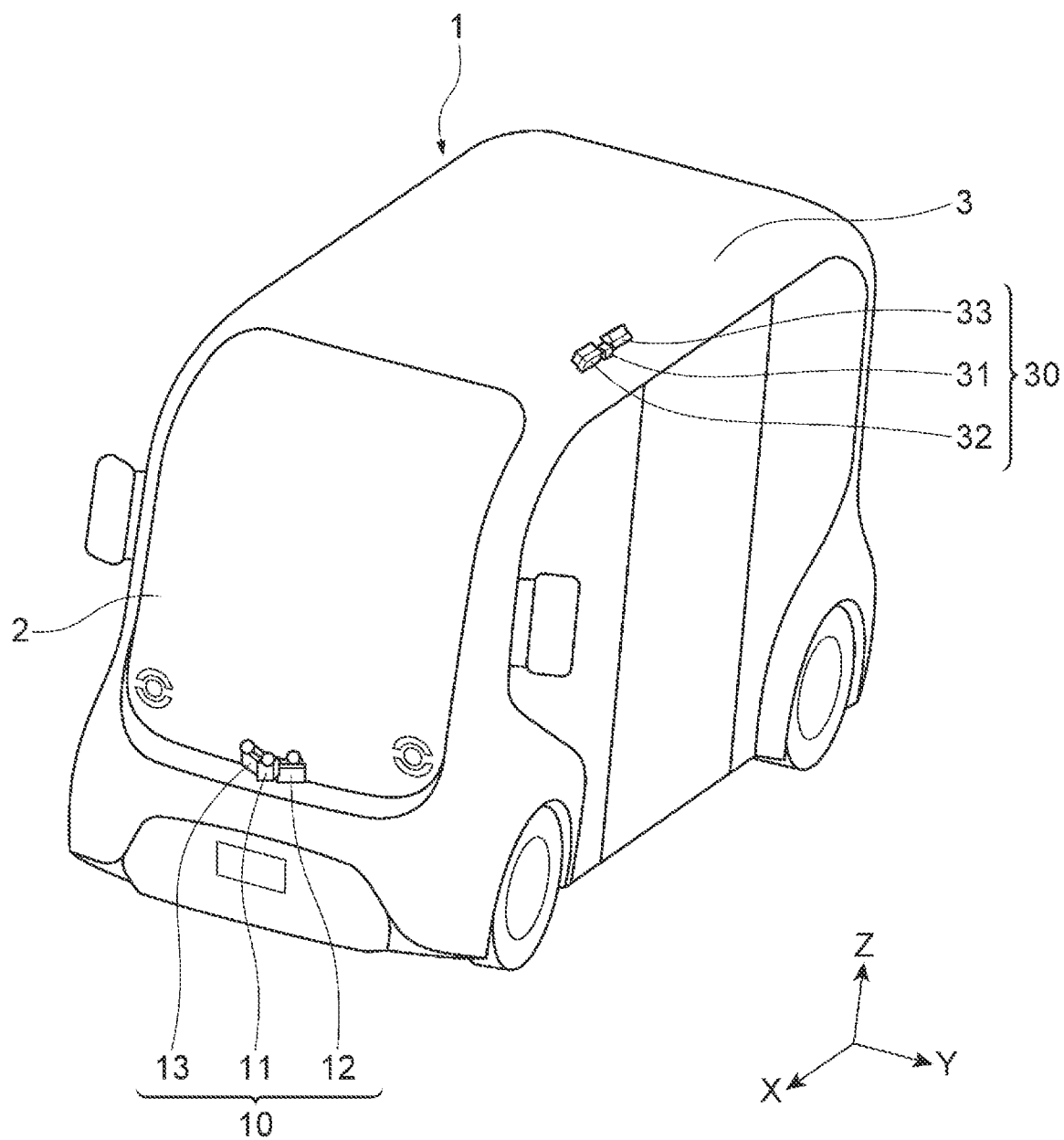
FIG. 1 is a diagram showing a vehicle that includes a vehicle sensor attaching structure according to an embodiment.

FIG. 1 is a diagram showing a vehicle that includes a vehicle sensor attaching structure according to an embodiment. A vehicle 1 shown in FIG. 1 is provided with a front sensor group 10 and a roof left side sensor group 30 as sensors for detecting an object outside the vehicle by sensor fusion. The front sensor group 10 is attached to a front surface 2 of the vehicle 1 and detects an object in front of the vehicle 1. The roof left side sensor group 30 is attached to the left side of a roof 3 of the vehicle 1 and detects an object on the left side of the vehicle 1.

The vehicle 1 may be equipped with a rear sensor group and/or a roof right side sensor group. The rear sensor group can have the same configuration as the front sensor group 10, and the roof right side sensor group can have the same configuration as the roof left side sensor group 30.

Figure 2:
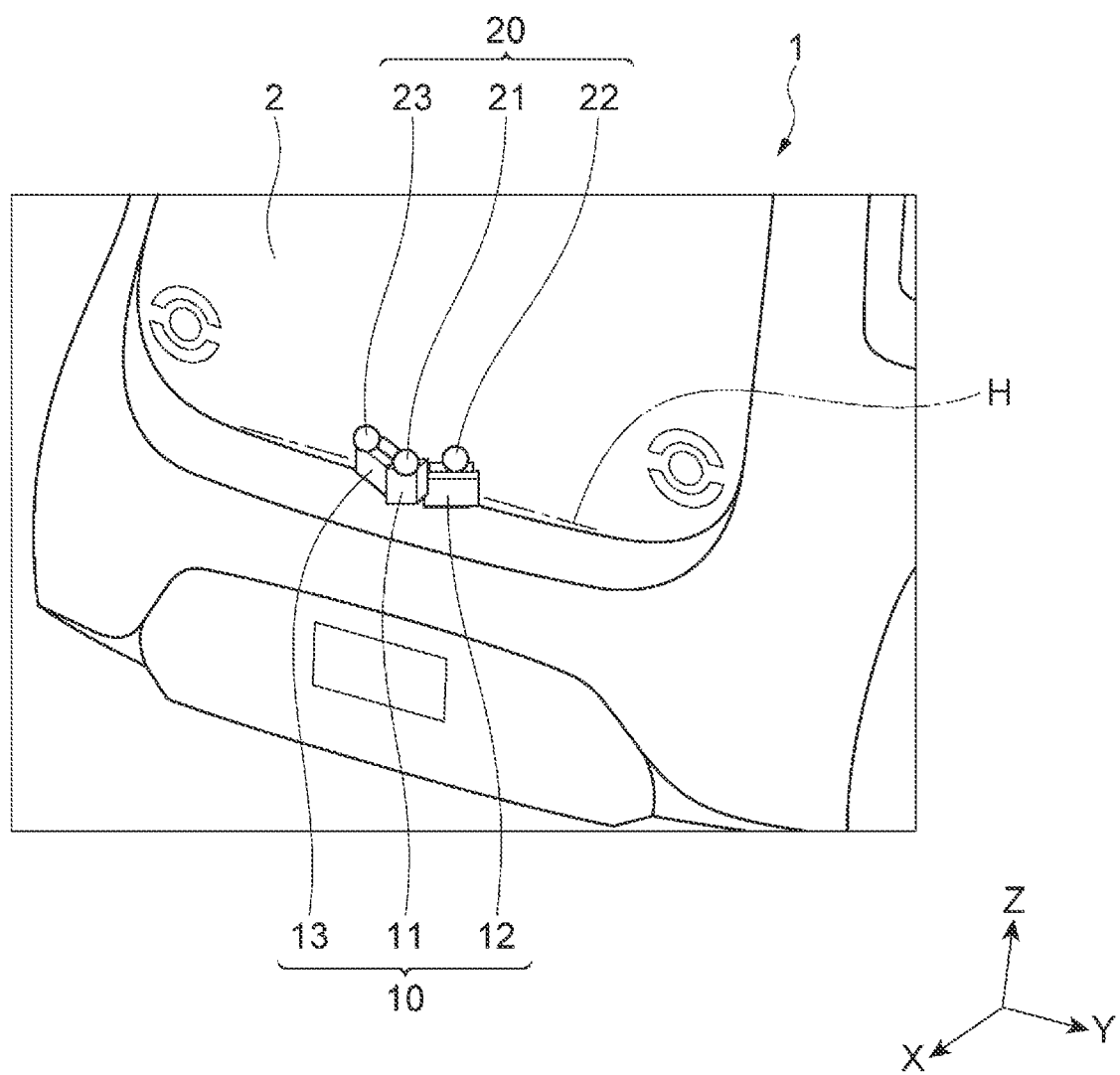
FIG. 2 is an enlarged view showing an example of an attaching structure of a front sensor group.

FIG. 2 is an enlarged view showing an example of an attaching structure of the front sensor group 10. As shown in FIGS. 1 and 2, the front sensor group 10 is attached above a front bumper of the vehicle 1 as an example. The attaching position of the front sensor group 10 is not particularly limited as long as it is attached to the front surface 2 of the vehicle 1. The front sensor group 10 may be attached above a windshield of the vehicle 1.

The attaching manner of the front sensor group 10 is also not particularly limited. The front sensor group 10 may be attached to the vehicle 1 via a bracket, or may be directly fixed to a vehicle body. Each sensor constituting the front sensor group 10 may be attached to the vehicle 1 as an integral unit, or each sensor may be individually fixed to the vehicle 1.

The front sensor group 10 includes a camera (first sensor) 11, a left side Light Detection and Ranging (LiDAR) (second sensor) 12, and a right side LiDAR (second sensor) 13. The first sensor is a sensor attached along the surface of the vehicle 1 so as to detect the external condition of the vehicle 1, and is a sensor disposed to be sandwiched between the two second sensors. The second sensors are sensors attached along the surface of the vehicle 1 so as to detect the external condition of the vehicle 1, and are sensors attached to sandwich the first sensor. The first sensor and the second sensors are different types of sensors. The first sensor and the second sensors are disposed side by side in a uniaxial direction along the surface of the vehicle 1. Hereinafter, the camera 11 will be described as an example of the first sensor, the left side LiDAR 12 will be described as an example of one of the second sensors, and the right side LiDAR 13 will be described as an example of the other of the second sensors.

The camera 11, the left side LiDAR 12, and the right side LiDAR 13 that are included in the front sensor group 10 are disposed side by side in the uniaxial direction along the front surface 2 of the vehicle 1. FIG. 2 shows a virtual axis H corresponding to the uniaxial direction in the camera 11, the left side LiDAR 12, and the right side LiDAR 13. The axis H is a virtual straight line extending in the Y-axis direction (vehicle width direction).

The "uniaxial direction" is an extending direction of the virtual axis (straight line). The uniaxial direction is not limited to the vehicle width direction. The uniaxial direction may be the height direction of the vehicle (Z-axis direction), the front-rear direction of the vehicle (X-axis direction), the extending direction of an arbitrary axis in the YZ plane, the extending direction of an arbitrary axis in the XZ plane or the XY plane, or the extending direction of an arbitrary axis in the three-dimensional space. The uniaxial direction can be different for each sensor group.

The "uniaxial direction along the front surface 2" means a direction parallel to the front surface 2 or a direction at a gentle angle with the front surface 2. The gentle angle may be an angle less than 90°, an angle less than 45°, or an angle less than 30°.

"Disposed side by side in the uniaxial direction" means, for example, that a center point or a detection unit (camera lens or light receiving portion of LiDAR) of each sensor, or a fastening portion between the sensor and the vehicle 1 is disposed side by side in the uniaxial direction. A certain range of deviation from the center point or the detection unit of each sensor can be allowed. The certain range is not particularly limited, but can be, for example, 1 cm, 3 cm, 5 cm, 10 cm, or the like. As long as the virtual axis passes through a part of each sensor, it may be regarded that the sensors are disposed side by side in the uniaxial direction.

The camera 11 is disposed to be sandwiched between the left side LiDAR 12 and the right side LiDAR 13 at equal intervals in the uniaxial direction. The criteria of the equal intervals are not particularly limited, but a distance can be measured, for example, with reference to the center point or the detection unit of each sensor. The equal intervals are not necessarily exactly equal distances. A certain range of deviation for the equal intervals is allowed. The certain range can be 0.1 m, 0.3 m, 0.5 m, or the like.

The camera 11 is an imaging device that captures images of an external condition of the vehicle 1. The specifications of the camera 11 are not particularly limited. The camera 11 may be a monocular camera or a stereo camera. The camera 11 is connected to an electronic unit (for example, an electronic control unit (ECU)) of the vehicle 1 by wiring (not shown).

The left side LiDAR 12 and the right side LiDAR 13 are detection devices for detecting an object outside the vehicle 1 using light. The left side LiDAR 12 and the right side LiDAR 13 transmit light to the surroundings of the vehicle 1 and detect the object by receiving the light reflected by the object around the vehicle 1. The left side LiDAR 12 and the right side LiDAR 13 are also connected to the electronic unit of the vehicle 1 by wiring (not shown).

Figure 3:
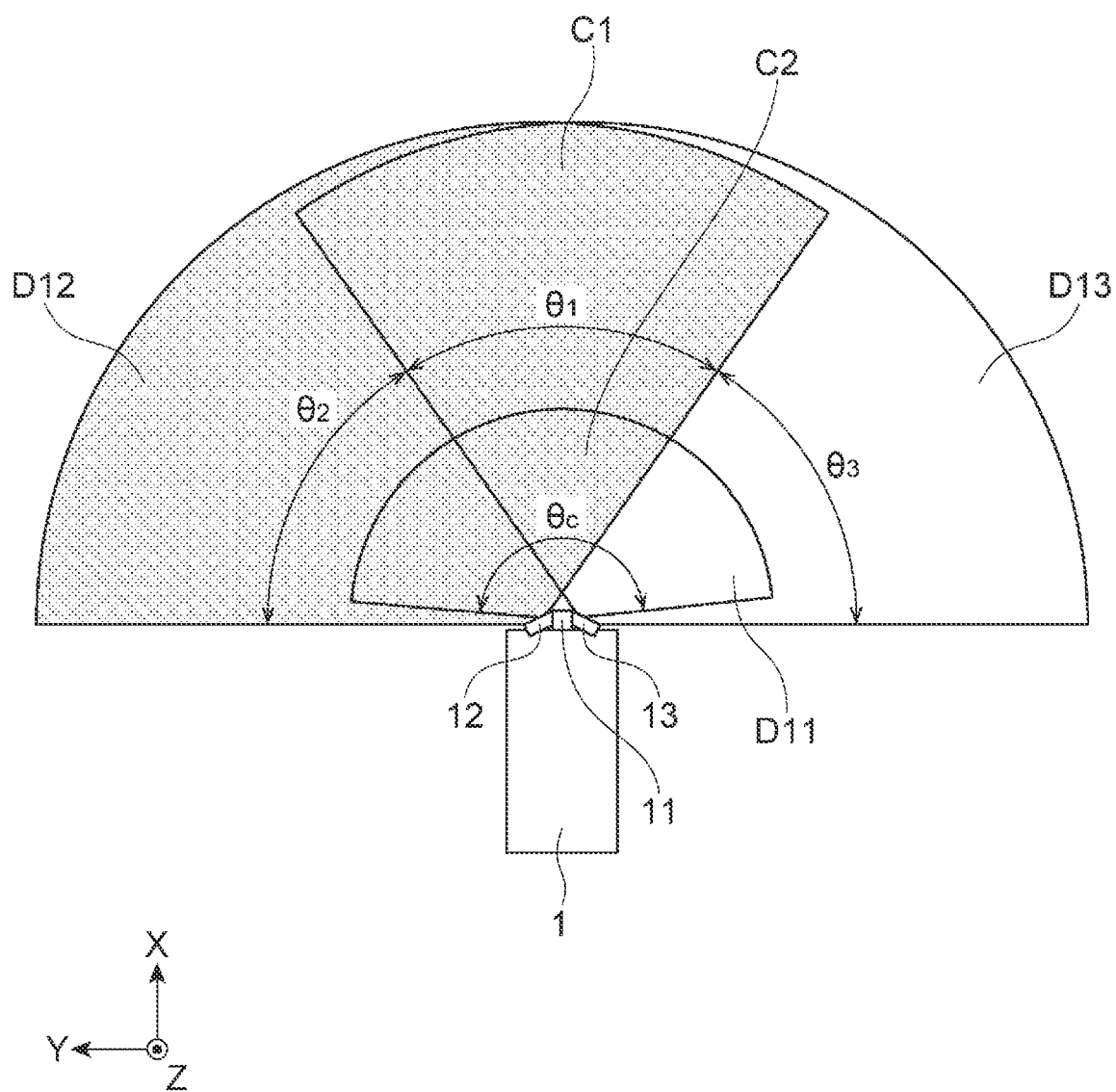
FIG. 3 is a diagram showing an example of a detection range of the front sensor group in a plan view.

FIG. 3 is a diagram showing an example of a detection range of the front sensor group 10 in a plan view. FIG. 3 shows a detection range D11 of the camera 11, a detection range D12 of the left side LiDAR 12, and a detection range D13 of the right side LiDAR 13. Further, an overlap detection range C1 in which the detection range D12 of the left side LiDAR 12 and the detection range D13 of the right side LiDAR 13 overlap, and a short-distance overlap detection range C2 in which all the detection ranges overlap are shown. The overlap detection range C1 and the short-distance overlap detection range C2 are formed in front of the camera 11.

Further, FIG. 3 shows, with reference to the camera 11, a detection angle of the overlap detection range C1 as $\theta 1$, a detection angle of the left side LiDAR 12 excluding the overlap detection range C1 as $\theta 2$, and a detection angle of the right side LiDAR 13 excluding the overlap detection range C1 as $\theta 3$. These detection angles will be used in the description of sensor control described later.

As shown in FIG. 3, the detection range of the front sensor group 10 is formed from the detection range D11 of the camera 11, the detection range D12 of the left side LiDAR 12, and the detection range D13 of the right side LiDAR 13. The detection range D11 of the camera 11 forms a wide-angle fan-shaped range toward the front of the vehicle 1. The detection range D12 of the left side LiDAR 12 and the detection range D13 of the right side LiDAR 13 are formed toward the forward left diagonal direction of the vehicle 1 and the forward right diagonal direction of the vehicle 1, respectively, and each forms a fan-shaped range extending farther than the detection range D11 of the camera 11.

The overlap detection range C1 is a range in which both the left side LiDAR 12 and the right side LiDAR 13 can detect an object, and is formed in front of the camera 11. The short-distance overlap detection range C2 is a range in which an object can be detected by the camera 11 in addition to the left side LiDAR 12 and the right side LiDAR 13.

Figure 4:
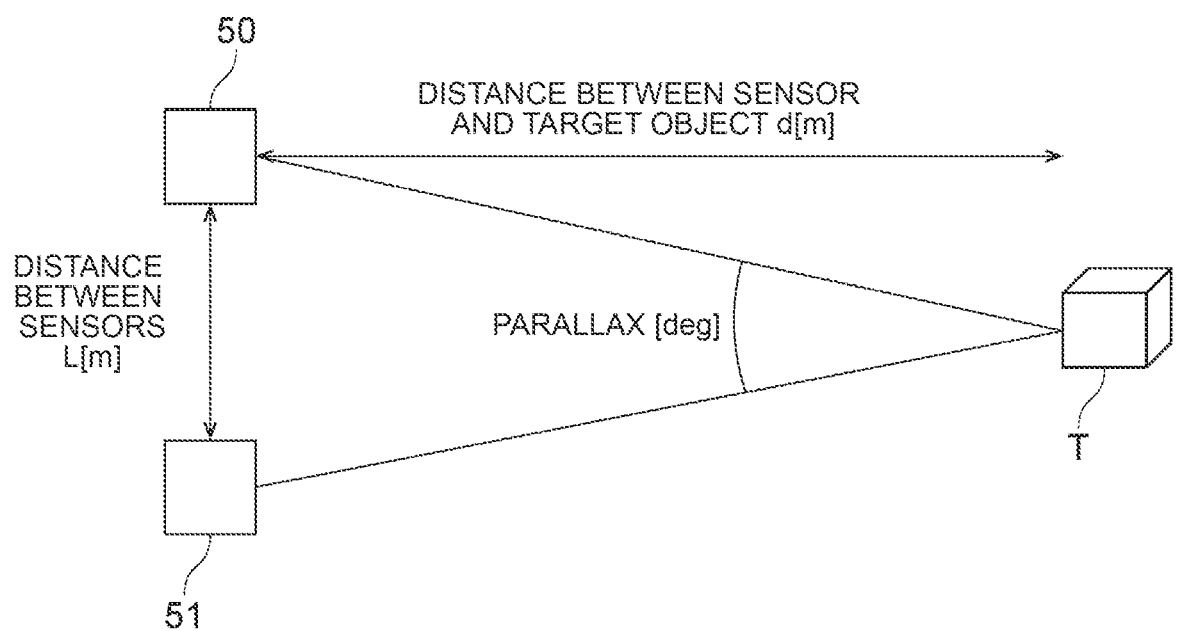
FIG. 4 is a diagram for illustrating a relationship between a distance between sensors and parallax of a target object.

FIG. 4 is a diagram for illustrating a relationship between a distance between the sensors and parallax of a target object. In FIG. 4, two sensors 50 and 51 and a target object T are shown as an example. Types of the sensors 50 and 51 are not particularly limited. The sensors 50 and 51 may be cameras, LiDAR, or millimeter-wave radars. The sensors 50 and 51 may correspond to the left side LiDAR 12 and the right side LiDAR 13.

The target object T is an object to be detected. The target object T is disposed within the overlap detection range of the sensors 50 and 51. As shown in FIG. 4, when a distance L between the sensors 50 and 51 and a positional relationship of the target object T with respect to the sensors 50 and 51 (including a distance d between the sensors 50 and 51 and the target object T) are determined, the parallax can be obtained.

Figure 5:
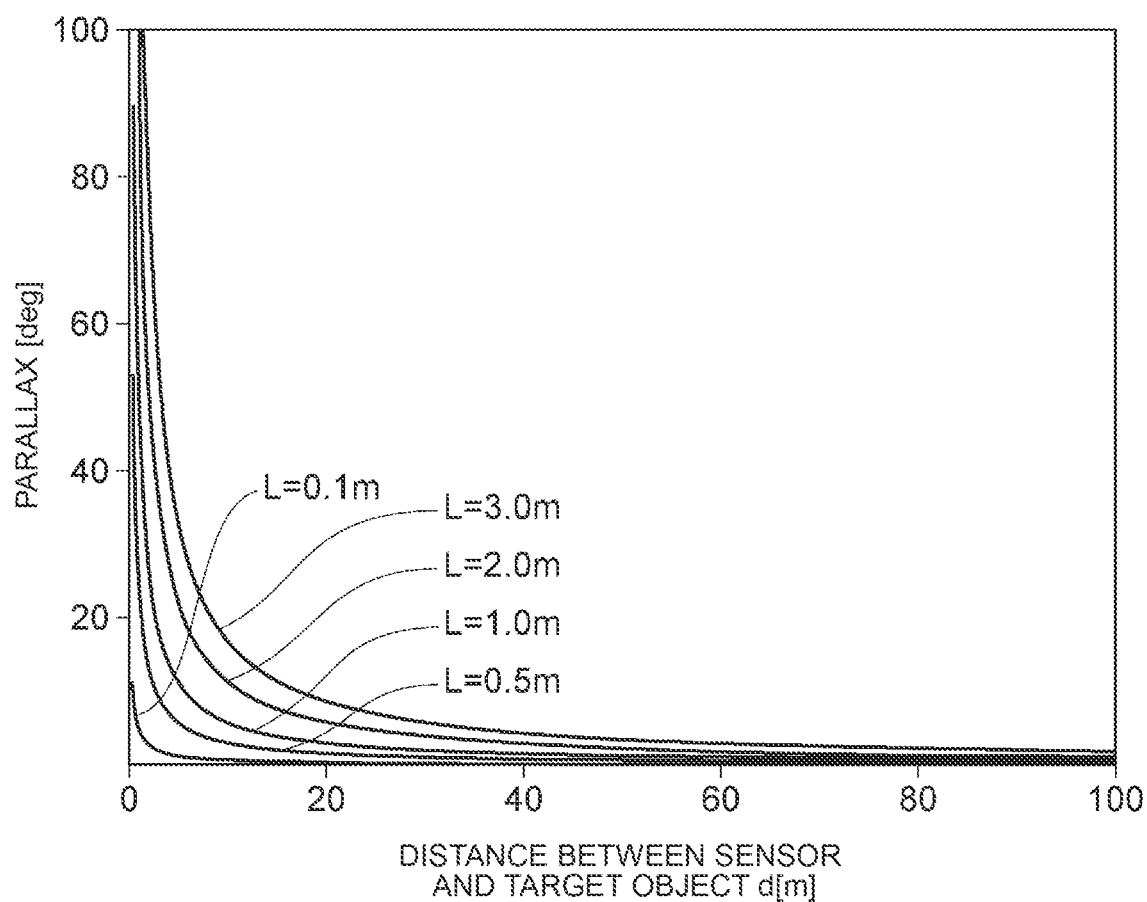
FIG. 5 is a graph showing an example of the relationship between the distance between the sensors and the target object, and parallax.

FIG. 5 is a graph showing an example of the relationship between the distance between the sensors and the target object, and the parallax. FIG. 5 shows a graph corresponding to a length of the distance L between the sensors 50 and 51. As shown in FIG. 5, it is understood that when the distance d between the sensors 50 and 51 and the target object T becomes long, a difference in the parallax due to the distance L between the sensors 50 and 51 becomes small, but when the distance d becomes short, influence on the parallax due to the distance L between the sensors 50 and 51 is large. When the parallax becomes large, the sensors 50 and 51 detect a different surface of the target object T, which may affect accuracy of the sensor fusion. Therefore, as an example, it is regarded that the sensors 50 and 51 are disposed such that the distance therebetween is small. In the embodiment, the distance between the left side LiDAR 12 and the right side LiDAR 13 is not particularly limited.

As shown in FIGS. 1 and 2, the front sensor group 10 is provided with a cleaning device group 20. The cleaning device group 20 is a device for cleaning each sensor. The cleaning device group 20 includes a first cleaning device 21 provided for the camera 11, a second cleaning device 22 provided for the left side LiDAR 12, and a third cleaning device 23 provided for the right side LiDAR 13.

The configurations of the first cleaning device 21, the second cleaning device 22, and the third cleaning device 23 are not particularly limited. The first cleaning device 21, the second cleaning device 22, and the third cleaning device 23 may clean each sensor by, for example, spraying a cleaning liquid or air, or may physically clean each sensor using a wiper.

Figure 6:
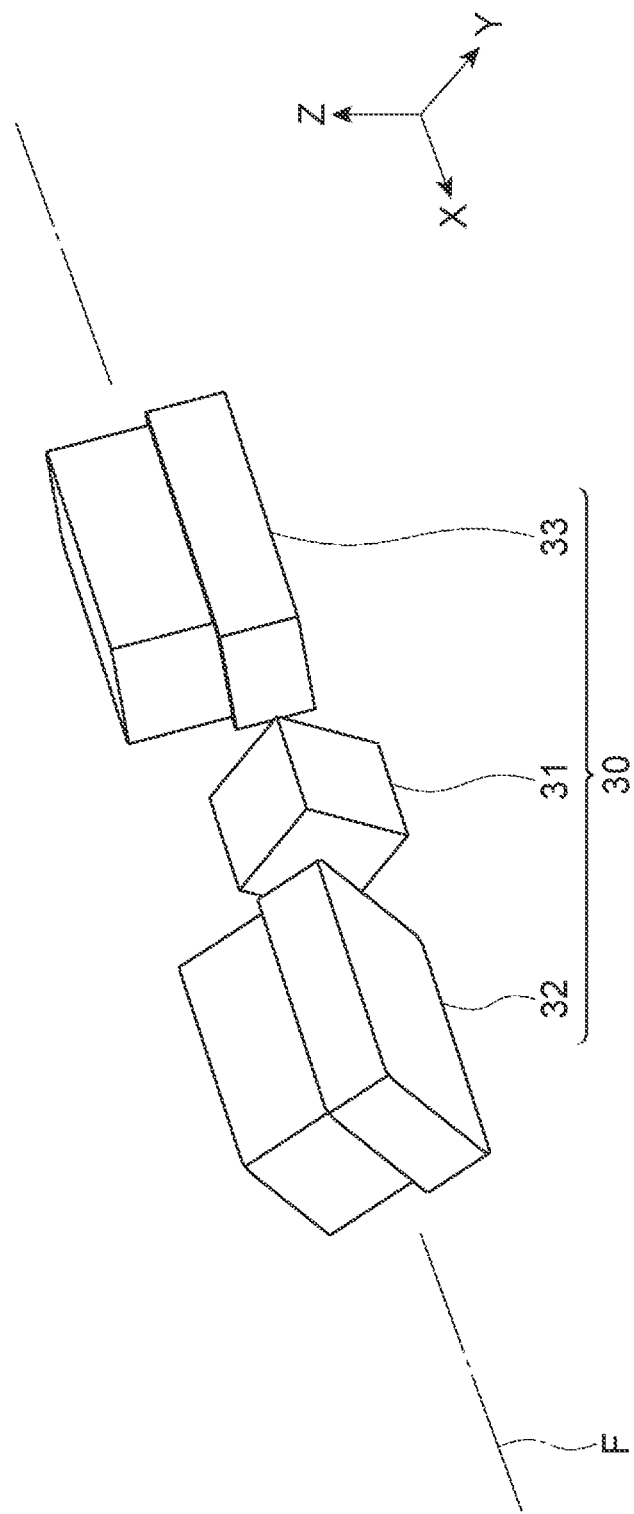
FIG. 6 is an enlarged view showing an example of an attaching structure of a roof left side sensor group.

FIG. 6 is a diagram for illustrating the roof left side sensor group 30. The roof left side sensor group 30 shown in FIGS. 1 and 6 is attached to the left end of the roof 3 of the vehicle 1 as an example. The attaching position of the roof left side sensor group 30 is also not limited to the position shown in FIG. 1. The attaching position of the roof left side sensor group 30 may be changed to a position that is forward or rearward of the position shown in FIG. 1, or the height of the attaching position of the roof left side sensor group 30 may be changed.

The attaching manner of the roof left side sensor group 30 is not particularly limited. The roof left side sensor group 30 may be attached to the vehicle 1 via the bracket, or may be directly fixed to the vehicle body. Each sensor constituting the roof left side sensor group 30 may be attached to the vehicle 1 as an integral unit, or each sensor may be individually fixed to the vehicle 1.

The roof left side sensor group 30 includes a camera 31, a front side LiDAR 32, and a rear side LiDAR 33. In the roof left side sensor group 30, the camera 31 is an example of the first sensor, the front side LiDAR 32 is one example of the second sensor, and the rear side LiDAR 33 is the other example of the second sensor.

The camera 31, the front side LiDAR 32, and the rear side LiDAR 33 that are included in the roof left side sensor group 30 are disposed side by side in the uniaxial direction along the roof 3 of the vehicle 1. FIG. 6 shows a virtual axis F corresponding to the uniaxial direction in the camera 31, the front side LiDAR 32, and the rear side LiDAR 33. The axis F is a virtual straight line extending in the X-axis direction (front-rear direction of the vehicle).

In the roof left side sensor group 30, similarly, the uniaxial direction is not limited to the X axis direction, and the uniaxial direction can be an extending direction of an arbitrary axis in the three-dimensional space as long as it is along the roof 3 of the vehicle 1 to which the roof left side sensor group 30 is attached. The "uniaxial direction along the roof 3" and "disposed side by side in the uniaxial direction" can be also interpreted in the same manner as in the front sensor group 10. A cleaning device group may be provided for the roof left side sensor group 30 in the same manner as the front sensor group 10.

As shown in FIG. 6, the camera 31, the front side LiDAR 32, and the rear side LiDAR 33 are attached to face downward in a diagonally left direction in order to detect an object on the left side of the vehicle 1 (another vehicle or the like). The front side LiDAR 32 and the rear side LiDAR 33 are disposed such that the orientation of each of the front side LiDAR 32 and the rear side LiDAR 33 is different in order to detect different detection ranges in the roll direction of the vehicle 1.

Figure 7:
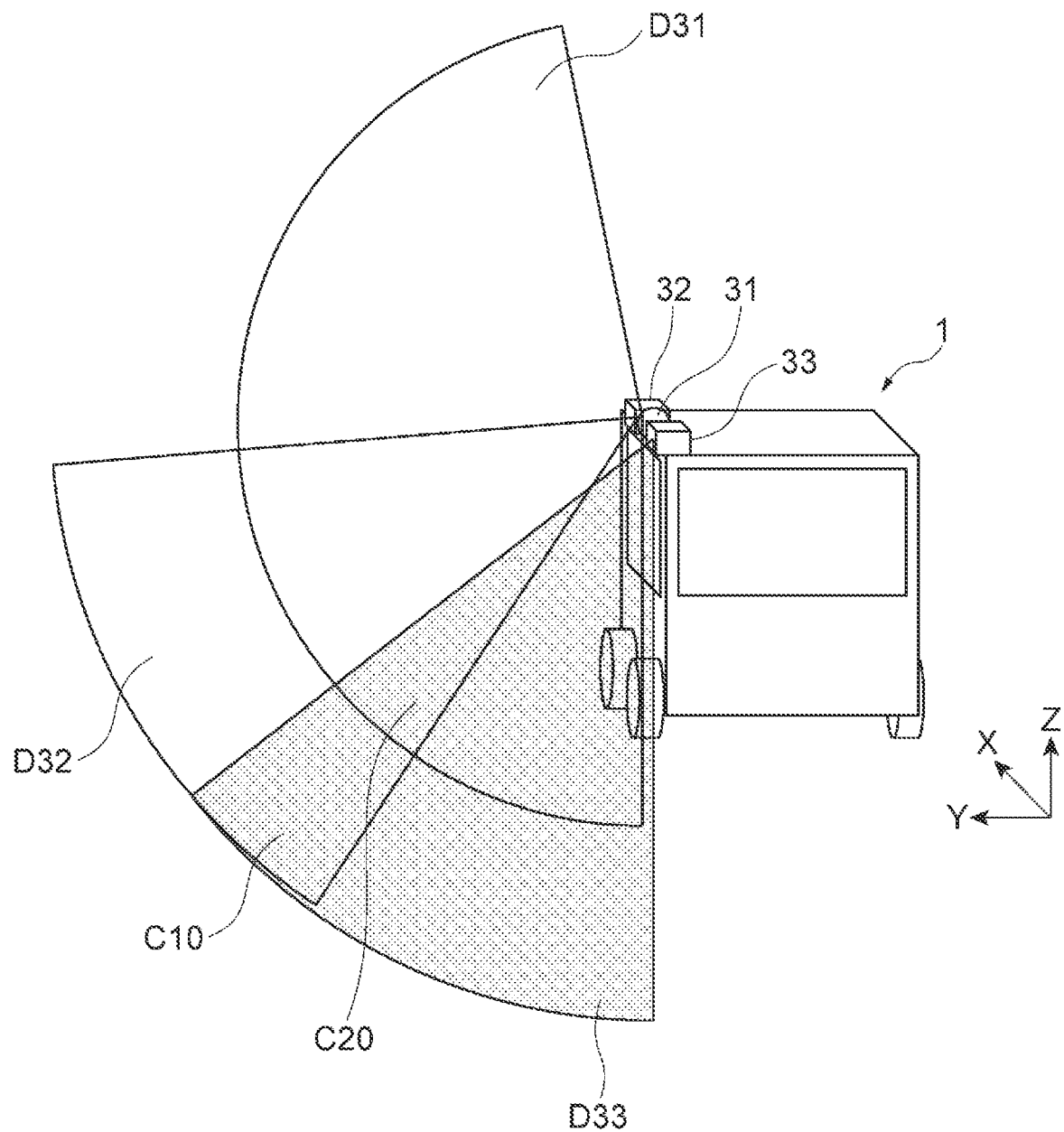
FIG. 7 is a diagram showing an example of a detection range of the roof left side sensor group.

FIG. 7 is a diagram showing an example of the detection range of the roof left side sensor group 30. FIG. 7 shows a view of the vehicle 1 as viewed from the rear. FIG. 7 shows a detection range D31 of the camera 31, a detection range D32 of the front side LiDAR 32, and a detection range D33 of the rear side LiDAR 33. Further, an overlap detection range C10 in which the detection range D32 of the front side LiDAR 32 and the detection range D33 of the rear side LiDAR 33 overlap, and a short-distance overlap detection range C20 in which all the detection ranges overlap are shown. The overlap detection range C10 and the short-distance overlap detection range C20 are formed in front of the camera 31 (sensor detection direction of the camera 31).

As shown in FIG. 7, the detection range of the roof left side sensor group 30 is formed from the detection range D31 of the camera 31, the detection range D32 of the front side LiDAR 32, and the detection range D33 of the rear side LiDAR 33. The detection range D31 of the camera 31 forms a wide-angle fan-shaped range from the left end of the roof 3 of the vehicle 1 toward the lower left of the vehicle 1.

The detection range D32 of the front side LiDAR 32 and the detection range D33 of the rear side LiDAR 33 are each formed from the left end of the roof 3 of the vehicle 1 toward the lower left of the vehicle 1, and each forms a fan-shaped range extending farther than the detection range D31 of the camera 31.

The camera 31, the front side LiDAR 32, and the rear side LiDAR 33 can be configured in the same manner as the camera 11, the left side LiDAR 12, and the right side LiDAR 13 in the front sensor group 10. It is not necessary to completely match the configurations of the front sensor group 10 and the roof left side sensor group 30, and sensors with appropriate specifications according to the attaching position can be adopted.

With the vehicle sensor attaching structure according to the embodiment described above, since the first sensor and the second sensors that perform sensor fusion are disposed side by side in the uniaxial direction along the surface of the vehicle, arithmetic processing for the sensor fusion can be facilitated just by reflecting the difference in the position of each sensor in the uniaxial direction as compared with a case where the first sensor and the second sensors are randomly disposed in the up-down and right-left directions. Further, with the vehicle sensor attaching structure, since the one first sensor is disposed to be sandwiched between the two second sensors at equal intervals, arithmetic processing for the sensor fusion can be facilitated as compared with a case where the distance from the one first sensor to the one second sensor and the distance from the one first sensor to the other second sensor are different, so that accuracy of object recognition and the like can be improved.

Further, with the vehicle sensor attaching structure, the camera 11 with a wide detection angle is disposed to be sandwiched between the left side LiDAR 12 and the right side LiDAR 13 that have long detection distances at equal intervals, which is advantageous for object recognition by the sensor fusion.

Further, with the vehicle sensor attaching structure, since the detection ranges of the left side LiDAR 12 and the right side LiDAR 13 have the overlap detection range C1 that overlaps in front of the camera 11, object recognition can be effectively performed by the sensor fusion.

Sensor Control Device

Figure 8:
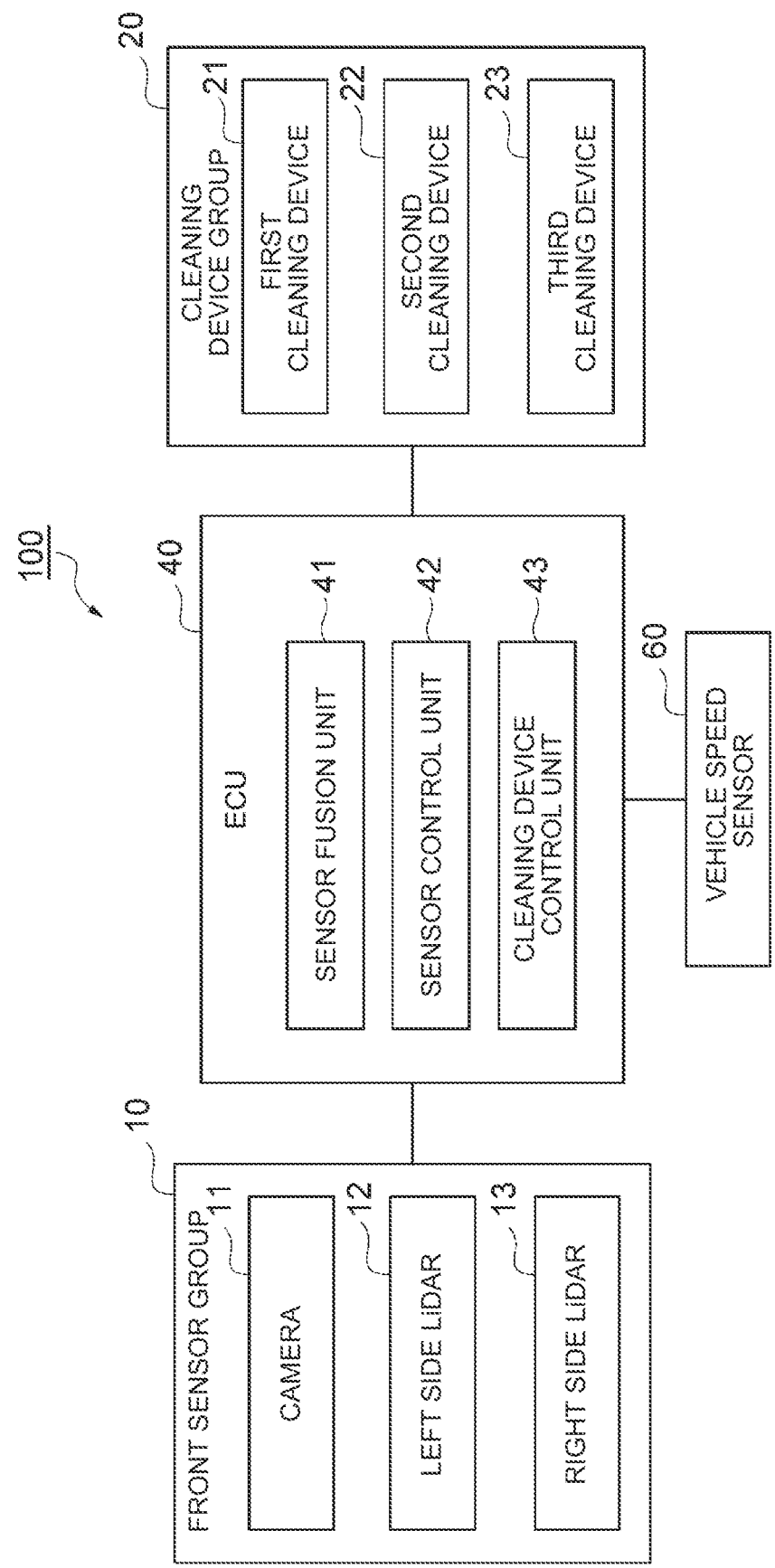
FIG. 8 is a block diagram showing a sensor control device according to the embodiment.

Subsequently, a sensor control device for controlling various sensors in the vehicle sensor attaching structure described above will be described. FIG. 8 is a block diagram showing the sensor control device according to the embodiment.

A sensor control device 100 shown in FIG. 8 is a device that is mounted on the vehicle 1 and that controls the various sensors of the vehicle 1. Here, as an example, the sensor control device that controls the front sensor group 10 and the cleaning device group 20 will be described.

As shown in FIG. 8, the sensor control device 100 includes an electronic control unit (ECU) 40 that comprehensively controls the device. The ECU 40 is an electronic control unit including a central processing unit (CPU), a read only memory (ROM), a random access memory (RAM), and the like. In the ECU 40, for example, various functions are realized by causing the CPU to execute a program stored in the ROM or the RAM. The ECU 40 may be composed of a plurality of electronic units.

The ECU 40 is connected to the front sensor group 10, the cleaning device group 20, and a vehicle speed sensor 60. The vehicle speed sensor 60 is a sensor for detecting a vehicle speed of the vehicle 1. The ECU 40 may be connected to the roof left side sensor group 30 and other cleaning device groups.

Next, the functional configuration of the ECU 40 will be described. As shown in FIG. 8, the ECU 40 includes a sensor fusion unit 41, a sensor control unit 42, and a cleaning device control unit 43.

The sensor fusion unit 41 recognizes an object by sensor fusion using a detection result from the front sensor group 10. The sensor fusion unit 41 recognizes a shape of the object by the sensor fusion that integratedly uses a detection point group detected by the left side LiDAR 12 and a detection point group detected by the right side LiDAR 13, for example, for an object such as a preceding vehicle included in the overlap detection range C1 in FIG. 3. The sensor fusion unit 41 may perform object recognition by the sensor fusion between the camera 11 and the left side LiDAR 12 or the right side LiDAR 13.

The sensor control unit 42 controls the various sensors. The sensor control unit 42 controls detection by the camera 11, the left side LiDAR 12, and the right side LiDAR 13 in the front sensor group 10. Specifically, the sensor control unit 42 switches the control modes of the left side LiDAR 12 and the right side LiDAR 13 between a high cycle detection mode and a high density detection mode. The high cycle detection mode is a mode for detecting the overlap detection range C1 shown in FIG. 3 at a high cycle. The high density detection mode is a mode for detecting the overlap detection range C1 shown in FIG. 3 at a high density.

Figure 9A:
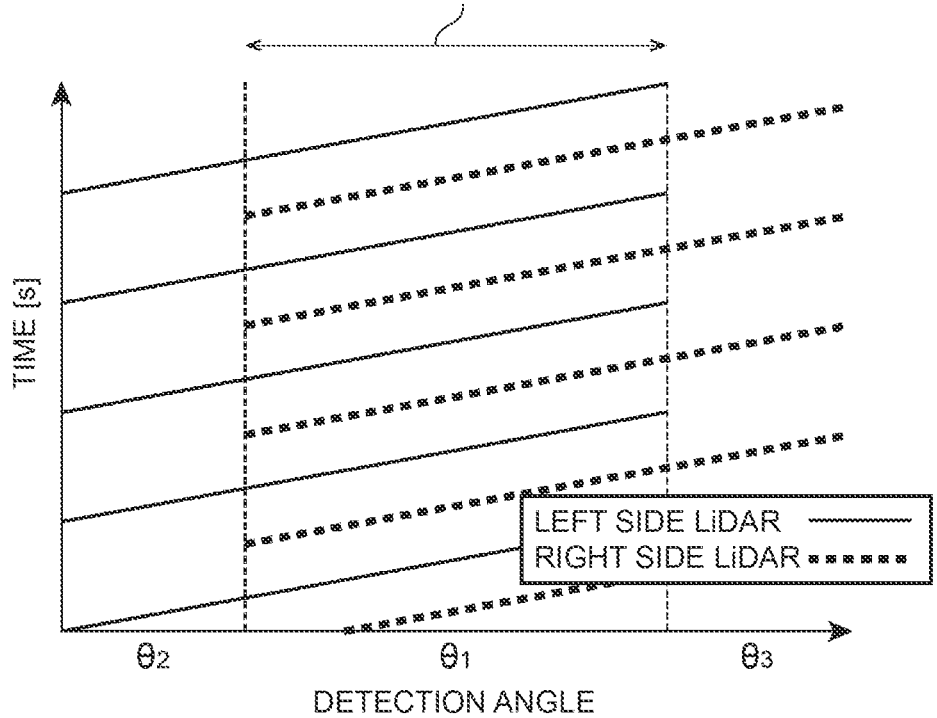
FIG. 9A is a graph for illustrating an example of a high cycle detection mode.

FIG. 9A is a graph for illustrating an example of the high cycle detection mode. In FIG. 9A, the vertical axis represents the time, and the horizontal axis represents the detection angle. In FIG. 9A, changes in the detection angle corresponding to the time of the left side LiDAR 12 are shown by the solid lines, and changes in the detection angle corresponding to the time of the right side LiDAR 13 are shown by the broken lines. The detection angle θ1 corresponds to the detection angle of the overlap detection range C1 shown in FIG. 3. Further, the detection angle θ2 corresponds to the detection angle of the left side LiDAR 12 excluding the overlap detection range C1, and the detection angle θ3 corresponds to the detection angle of the right side LiDAR 13 excluding the overlap detection range C1.

As shown in FIG. 9A, the sensor control unit 42 controls the left side LiDAR 12 and right side LiDAR 13 such that the left side LiDAR 12 and the right side LiDAR 13 alternately scans the overlap detection range C1 in the high cycle detection mode.

The sensor control unit 42 switches to the high cycle detection mode by adjusting the scanning cycle such that the right side LiDAR 13 scans the range of the detection angle θ1 at a timing when the left side LiDAR 12 scans the range of the detection angle θ3 (the overlap detection range C1), for example. In the high cycle detection mode, it is possible to detect a change in the object in a short period of time by scanning the overlap detection range C1 at a high cycle.

Figure 9B:
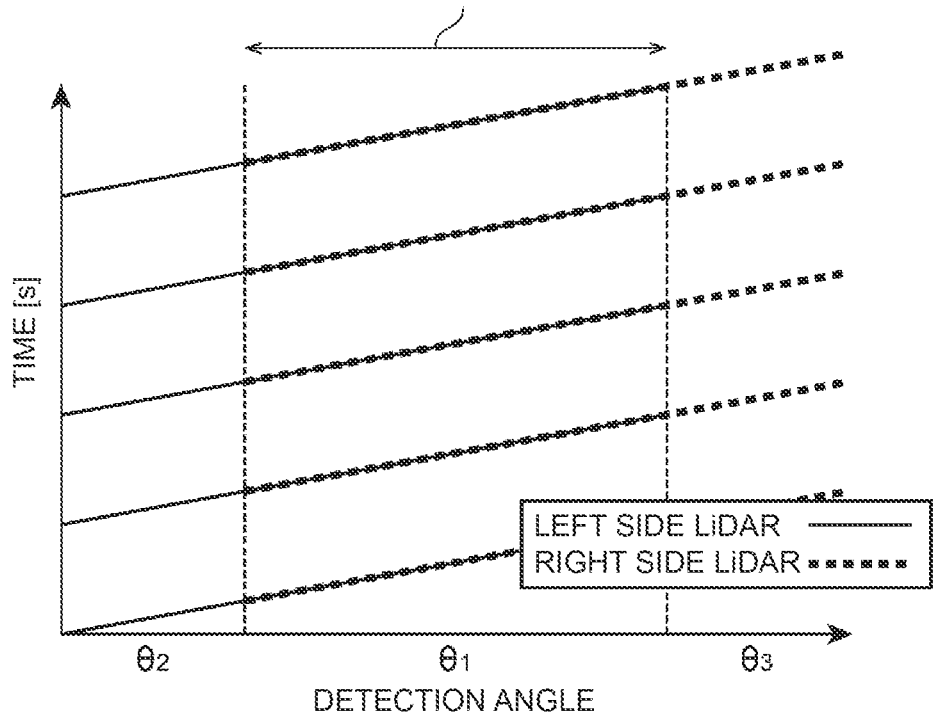
FIG. 9B is a graph for illustrating an example of a high density detection mode.

FIG. 9B is a graph for illustrating an example of the high density detection mode. Since the vertical axis and the horizontal axis in FIG. 9B are the same as those in FIG. 9A, description thereof is omitted. The sensor control unit 42 controls the left side LiDAR 12 and right side LiDAR 13 such that the left side LiDAR 12 and the right side LiDAR 13 simultaneously scans the overlap detection range C1 in the high density detection mode.

The sensor control unit 42 switches to the high density detection mode by adjusting the scanning cycle such that a timing at which the left side LiDAR 12 scans the range of the detection angle θ1 and a timing at which the right side LiDAR 13 scans the range of the detection angle θ1 match, for example. In the high density detection mode, more detection points can be acquired for each object by scanning at a high density, so that accuracy of object recognition can be improved. The high cycle detection mode and the high density detection mode are not limited to the manner shown in FIG. 9A and FIG. 9B.

The sensor control unit 42 switches the control modes of the left side LiDAR 12 and the right side LiDAR 13 based on, for example, the vehicle speed of the vehicle 1 detected by the vehicle speed sensor 60. When the vehicle speed of the vehicle 1 is equal to or higher than a first threshold value, the sensor control unit 42 switches the control modes of the left side LiDAR 12 and the right side LiDAR 13 to the high cycle detection mode. The first threshold value is a threshold value having a preset value. The first threshold value is not particularly limited, and may be 60 km/h or may be 50 km/h.

When the vehicle speed of the vehicle 1 is less than a second threshold value, the sensor control unit 42 switches the control modes of the left side LiDAR 12 and the right side LiDAR 13 to the high density detection mode. The second threshold value is a threshold value having the same value as the first threshold value or a value smaller than the first threshold value. The second threshold value is also not particularly limited, and may be 20 km/h or may be 30 km/h. When the vehicle speed of the vehicle 1 is less than the first threshold value and equal to or higher than the second threshold value, the sensor control unit 42 maintains the current control modes.

The cleaning device control unit 43 controls the cleaning device group 20. The cleaning device control unit 43 controls cleaning timings of the first cleaning device 21, the second cleaning device 22, and the third cleaning device 23 in the cleaning device group 20.

Figure 10:
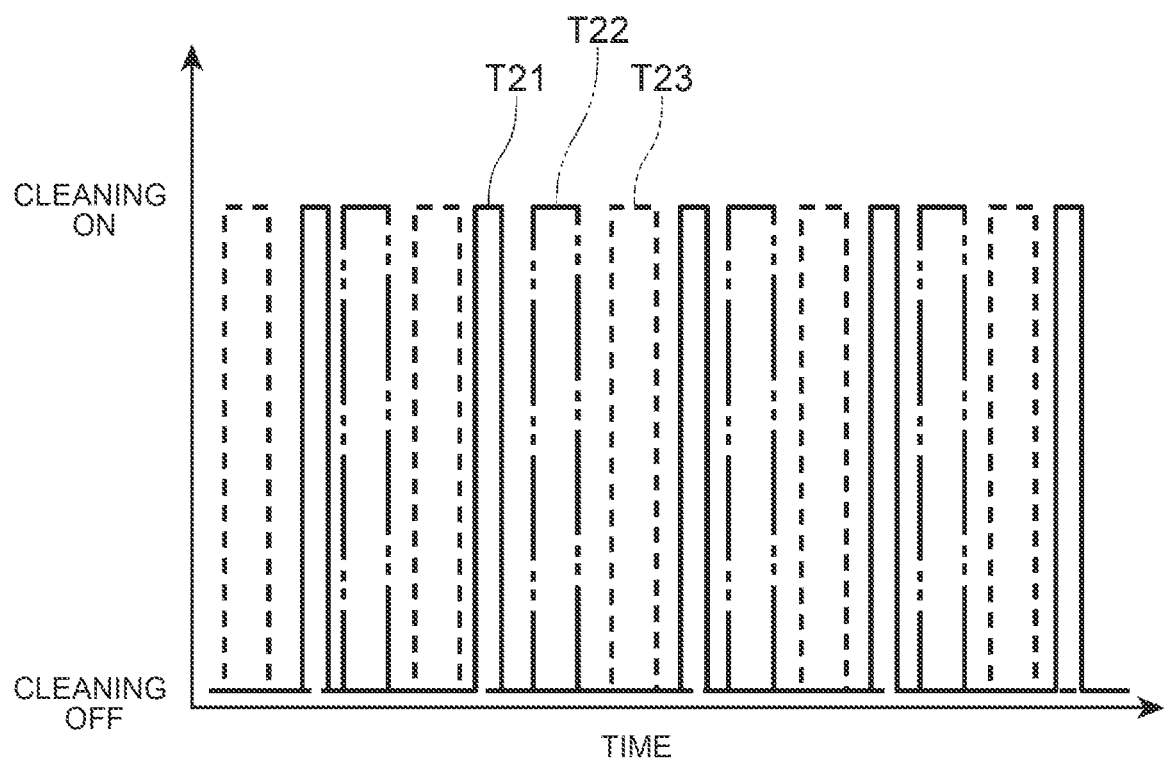
FIG. 10 is a graph for illustrating an example of a cleaning timing.

FIG. 10 is a graph for illustrating an example of the cleaning timing. In FIG. 10, the vertical axis represents the cleaning on/off state, and the horizontal axis represents the time. FIG. 10 shows a cleaning timing T21 of the first cleaning device 21, a cleaning timing T22 of the second cleaning device 22, and a cleaning timing T23 of the third cleaning device 23.

As shown in FIG. 10, the cleaning device control unit 43 controls the cleaning timings such that each of the cleaning times (cleaning on time) of the first cleaning device 21, the second cleaning device 22, and the third cleaning device 23 does not overlap. The cleaning device control unit 43 may periodically repeat cleaning of the first cleaning device 21, the second cleaning device 22, and the third cleaning device 23 such that the each of the cleaning times does not overlap.

The cleaning device control unit 43 may recognize that the first cleaning device 21 is at the cleaning timing, for example, in response to a cleaning request for the camera 11. The cleaning request for the camera 11 may be controlled by the ECU 40. The cleaning timing may be a timing after a certain time has elapsed from the previous cleaning while the vehicle 1 is traveling, or may be a predetermined timing according to the traveling distance of the vehicle 1. The cleaning timing is not particularly limited.

When the cleaning device control unit 43 recognizes that the first cleaning device 21 is at the cleaning timing, the cleaning device control unit 43 checks that the second cleaning device 22 and the third cleaning device 23 are not being cleaned. The cleaning device control unit 43 starts cleaning the camera 11 by the first cleaning device 21 when the second cleaning device 22 and the third cleaning device 23 are not being cleaned.

Processing of Sensor Control Device

Figure 11:
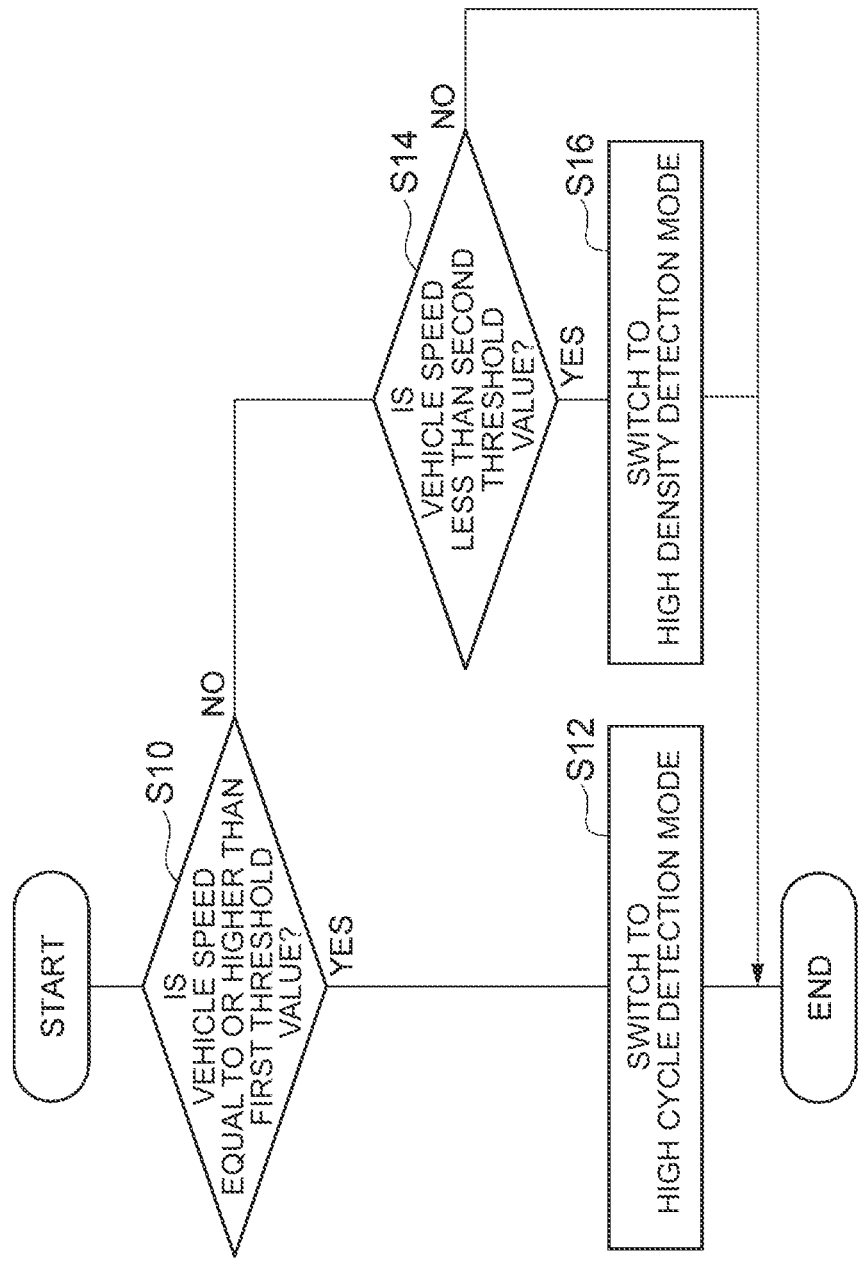
FIG. 11 is a flowchart showing an example of a sensor control mode switching process.

Next, processing of the sensor control device 100 according to the embodiment will be described with reference to the drawings. FIG. 11 is a flowchart showing an example of a sensor control mode switching process. The sensor control mode switching process is executed, for example, while the vehicle 1 is traveling.

As shown in FIG. 11, the ECU 40 of the sensor control device 100 determines, as S10, whether the vehicle speed of the vehicle 1 is equal to or higher than the first threshold value by the sensor control unit 42. The sensor control unit 42 determines whether the vehicle speed is equal to or higher than the first threshold value based on the detection result from the vehicle speed sensor 60. When the sensor control unit 42 determines that the vehicle speed is equal to or higher than the first threshold value (S10: YES), the routine proceeds to S12. When the sensor control unit 42 determines that the vehicle speed is not equal to or higher than the first threshold value (S10: NO), the routine proceeds to S14.

In S12, the sensor control unit 42 switches the control modes of the left side LiDAR 12 and the right side LiDAR 13 to the high cycle detection mode. The sensor control unit 42 adjusts the scanning cycle such that the right side LiDAR 13 scans the range of the detection angle θ3 at a timing when the left side LiDAR 12 scans the range of the detection angle θ1 (the overlap detection range C1), for example. After that, the sensor control unit 42 terminates the current process.

In S14, the sensor control unit 42 determines whether the vehicle speed of the vehicle 1 is less than the second threshold value. The sensor control unit 42 determines whether the vehicle speed is less than the second threshold value based on the detection result from the vehicle speed sensor 60. When the sensor control unit 42 determines that the vehicle speed is less than the second threshold value (S14: YES), the routine proceeds to S16. When the sensor control unit 42 determines that the vehicle speed is not less than the second threshold value (S14: NO), the sensor control unit 42 terminates the current process without switching the control modes.

In S16, the sensor control unit 42 switches the control modes of the left side LiDAR 12 and the right side LiDAR 13 to the high density detection mode. The sensor control unit 42 adjusts the scanning cycle such that a timing at which the right side LiDAR 13 scans the range of the detection angle θ1 and a timing at which the left side LiDAR 12 scans the range of the detection angle θ1 (the overlap detection range C1) match, for example. After that, the sensor control unit 42 terminates the current process.

Figure 12:
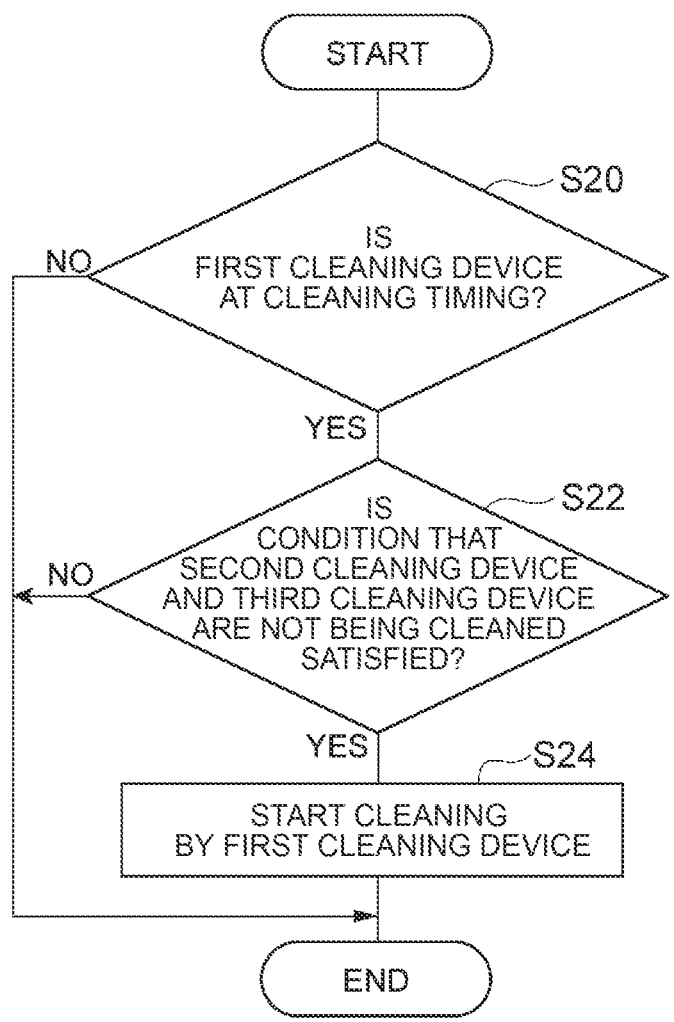
FIG. 12 is a flowchart showing an example of a cleaning device control process.

FIG. 12 is a flowchart showing an example of a cleaning device control process. The cleaning device control process shown in FIG. 12 is executed, for example, while the vehicle 1 is traveling. Here, the process of the first cleaning device 21 will be described as an example, but the same process can be applied to the second cleaning device 22 and the third cleaning device 23.

As shown in FIG. 12, the ECU 40 of the sensor control device 100 determines, as S20, whether the first cleaning device 21 is at the cleaning timing by the cleaning device control unit 43. The cleaning device control unit 43 determines that the first cleaning device 21 is at the cleaning timing in response to a cleaning request for the camera 11 or a predetermined time lapse. When the cleaning device control unit 43 determines that the first cleaning device 21 is at the cleaning timing (S20: YES), the routine proceeds to S22. When the cleaning device control unit 43 determines that the first cleaning device 21 is not at the cleaning timing (S20: NO), the current process is terminated.

In S22, the cleaning device control unit 43 determines whether the second cleaning device 22 and the third cleaning device 23 are being cleaned. When the cleaning device control unit 43 determines that a condition that the second cleaning device 22 and the third cleaning device 23 are not being cleaned is satisfied (S22: YES), the routine proceeds to S24. When the cleaning device control unit 43 determines that a condition that the second cleaning device 22 and the third cleaning device 23 are not being cleaned is not satisfied (S22: NO), the current process is terminated.

In S24, the cleaning device control unit 43 starts cleaning the camera 11 by the first cleaning device 21. The first cleaning device 21 cleans the predetermined camera 11 by a cleaning liquid or the like.

With the sensor control device 100 according to the embodiment described above, arithmetic processing for the sensor fusion can be facilitated by the vehicle sensor attaching structure described above. Further, in the sensor control device 100, since the control modes of the left side LiDAR 12 and the right side LiDAR 13 can be switched between the high cycle detection mode in which the left side LiDAR 12 and the right side LiDAR 13 alternately scan the overlap detection range C1 and the high density detection mode in which the left side LiDAR 12 and the right side LiDAR 13 simultaneously scan the overlap detection range C1, it is possible to appropriately recognize the object by the sensor fusion by switching the control modes according to the state of the vehicle 1, etc.

Further, with the sensor control device 100, by switching the control modes of the left side LiDAR 12 and the right side LiDAR 13 to the high cycle detection mode when the vehicle speed of the vehicle 1 is equal to or higher than the first threshold value, the object can be recognized in a short period of time when the vehicle speed is high and an external condition of the vehicle changes at a high speed. Further, by switching the control modes of the left side LiDAR 12 and the right side LiDAR 13 to the high density detection mode when the vehicle speed of the vehicle 1 is less than the second threshold value that is smaller than the first threshold value, the object can be accurately recognized in a situation in which the vehicle speed is low and an external condition of the vehicle changes at a low speed.

Further, with the sensor control device 100, the cleaning timings are controlled such that the cleaning time of the first cleaning device 21 does not overlap the cleaning times of the second cleaning device 22 and the third cleaning device 23, so that it is possible to suppress the occurrence of a situation in which the cleaning times overlap and object recognition by the sensor fusion is hindered.

Although the embodiment of the disclosure has been described above, the disclosure is not limited to the embodiment above. The disclosure can be implemented in various modes including various modifications and improvements based on the knowledge of those skilled in the art, including the embodiment as described above.

For example, the first sensor may be LiDAR and the second sensor may be a camera. A millimeter-wave radar may be used instead of LiDAR. The detection ranges of the two second sensors do not necessarily overlap. A manner may be adopted in which the first sensor and the second sensor perform sensor fusion.

The sensor control unit 42 may switch the control modes of the two second sensors based on acceleration detected by an acceleration sensor of the vehicle 1. The sensor control unit 42 may switch to the high cycle detection mode, for example, when the vehicle 1 is accelerating. Similarly, the sensor control unit 42 may switch the control modes of the two second sensors based on yaw rate detected by a yaw rate sensor of the vehicle 1. The sensor control unit 42 may switch to the high cycle detection mode, for example, when the yaw rate of the vehicle 1 is equal to or higher than a predetermined threshold value. The steering angle may be used instead of the yaw rate.

The front sensor group 10 and the roof left side sensor group 30 are not necessarily connected to the sensor control device 100. Further, the sensor control device 100 does not necessarily switch the control modes of the two second sensors.

The vehicle sensor attaching structure does not necessarily include the cleaning device group 20. The sensor control device 100 also does not necessarily include the cleaning device control unit 43 that controls the cleaning device group 20.

What is claimed is:
1. A sensor control device comprising:
a vehicle sensor attaching structure in which a first sensor and second sensors for detecting an object outside a vehicle by sensor fusion are attached to the vehicle, wherein the first sensor and the second sensors are disposed side by side in a uniaxial direction along a surface of the vehicle, and the first sensor is disposed to be sandwiched between two of the second sensors at equal intervals; and a sensor control unit that controls the first sensor and the second sensors in the vehicle sensor attaching structure; wherein:

the first sensor is a camera;

the second sensors are Light Detection and Ranging (LiDAR);

detection ranges of the second sensors have an overlap detection range that overlaps in front of the first sensor;

the sensor control unit is able to switch control modes of the second sensors between a high cycle detection mode in which the second sensors alternately scan the overlap detection range and a high density detection mode in which the second sensors simultaneously scan the overlap detection range;

the sensor control unit switches the control modes of the second sensors to the high cycle detection mode when a vehicle speed of the vehicle is equal to or higher than a first threshold value, and switches the control modes of the second sensors to the high density detection mode when the vehicle speed of the vehicle is less than a second threshold value; and the second threshold value is a threshold value having the same value as the first threshold value or a value smaller than the first threshold value.

2. The sensor control device according to claim 1, further comprising:

a first cleaning device attached to the first sensor;

a second cleaning device attached to one of the second sensors;

a third cleaning device attached to another of the second sensors; and a cleaning device control unit that controls a cleaning timing of each of the first cleaning device, the second cleaning device, and the third cleaning device, wherein the cleaning device control unit controls the cleaning timing such that a cleaning time of the first cleaning device does not overlap a cleaning time of the second cleaning device and a cleaning time of the third cleaning device.

* * * * *